United States Patent
Saccomanno et al.

(10) Patent No.: US 6,906,257 B2
(45) Date of Patent: Jun. 14, 2005

(54) METALLIC COATED DIELECTRIC SUBSTRATES

(75) Inventors: Robert J. Saccomanno, Montville, NJ (US); Gary A. West, Butler, PA (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 10/318,961

(22) Filed: Dec. 13, 2002

(65) Prior Publication Data

US 2003/0141096 A1 Jul. 31, 2003

Related U.S. Application Data

(63) Continuation-in-part of application No. 10/047,833, filed on Jan. 15, 2002.
(60) Provisional application No. 60/264,829, filed on Jan. 29, 2001.

(51) Int. Cl.[7] .............................. H01B 7/34; G02B 6/44
(52) U.S. Cl. ......................................... 174/36; 385/100
(58) Field of Search ............................... 174/36, 102 R, 174/102 C, 103, 107, 110 R, 113 R, 120 R; 385/100, 107, 123, 126, 127

(56) References Cited

U.S. PATENT DOCUMENTS

| | | | | |
|---|---|---|---|---|
| 4,327,246 A | * | 4/1982 | Kincaid .......................... | 174/36 |
| 4,454,379 A | * | 6/1984 | Cleveland et al. ............ | 174/107 |
| 4,692,373 A | * | 9/1987 | Welz et al. .................. | 442/382 |
| 4,816,618 A | * | 3/1989 | Bongianni ............... | 174/102 R |
| 4,978,812 A | * | 12/1990 | Akeyoshi et al. ...... | 174/35 MS |
| 5,208,426 A | * | 5/1993 | Kennedy et al. ............... | 174/36 |
| 5,250,753 A | * | 10/1993 | Schneider ..................... | 174/36 |
| 5,313,017 A | * | 5/1994 | Aldissi ........................ | 174/36 |
| 5,473,111 A | | 12/1995 | Hattori et al. | |
| 5,612,254 A | | 3/1997 | Mu et al. | |
| 5,639,989 A | | 6/1997 | Higgins, III | |
| RE36,561 E | * | 2/2000 | Saito et al. .................. | 503/227 |
| 6,030,671 A | | 2/2000 | Yang et al. .................... | 428/34 |
| 6,211,459 B1 | | 4/2001 | O'Groske et al. | |
| 6,239,361 B1 | * | 5/2001 | Snaper ........................ | 174/36 |
| 6,403,887 B1 | * | 6/2002 | Kebabjian et al. ...... | 174/110 R |
| 6,433,431 B1 | | 8/2002 | Farrar | |

FOREIGN PATENT DOCUMENTS

| | | | | |
|---|---|---|---|---|
| DE | 4417143 A1 | * | 5/1994 | ............ H01B/3/48 |
| EP | 0 412 242 A | * | 3/1990 | ............ G02B/6/16 |
| FR | 2 700 619 A | * | 7/1994 | ............ B02B/6/44 |
| JP | 01-124913 | * | 5/1989 | ............ H01B/11/06 |

* cited by examiner

Primary Examiner—William H. Mayo, III
(74) Attorney, Agent, or Firm—Kurt Luther; James W. Falk

(57) ABSTRACT

A metal/dielectric construction having either an optically transmissive substrate adapted for channeling light therethrough, or a dielectric substrate, an optional adhesion-promoting layer composed of an oxide form of at least one metal or metalloid deposited onto the surface of the substrate, a layer composed of a highly reflective and/or electrically conductive/electromagnetic metal overlaying the adhesion-promoting layer, and a protective layer composed of a parylene polymer film formed over the metal layer.

34 Claims, 8 Drawing Sheets

PARYLENE VACUUM EVAPORATION REACTOR

METALLIC COATED DIELECTRIC SUBSTRATES

RELATED APPLICATIONS

The present invention claims priority of U.S. Provisional Application Serial No. 60/264,829, filed Jan. 29, 2001, for "ROBUST HIGHLY REFLECTIVE WAVEGUIDE COATINGS", and also is a CIP from and claims priority of Serial No. 10/047,833, filed Jan. 15, 2002, for "ROBUST HIGHLY REFLECTIVE OPTICAL CONSTRUCTION," the teachings of each which are incorporated herein by reference to the extent that they do not conflict herewith. The related Applications have the same inventorship, and a common assignee as the present Application. The present Application is also related to U.S. Pat. No. 6,586,048, issued Jul. 1, 2003, for "METHOD FOR DEPOSITING A BARRIER COATING ON A POLYMERIC SUBSTRATE AND COMPOSITION COMPRISING SAID BARRIER COATING", the teachings of which are incorporated herein by reference to the extent that they do not conflict herewith.

FIELD OF THE INVENTION

The present invention relates generally to optical constructions and EMI shielding constructions, and more particularly to optical constructions having an optically transmissive substrate material coated with a robust highly reflective optical layer, and the use of silver coatings alone or in multilayer configurations with other metals for EMI shielding applications.

BACKGROUND OF THE INVENTION

Optical components such as waveguides are generally designed to confine and direct the propagation of light waves for many applications. In applications that rely on the reflection and transmission of light, significant gains in performance can be made when highly reflective materials are used in combination with optically transmissive materials. For example, a step-index fiber optic is composed of a thin strand of concentric layers of optically transmissive materials, a central optical medium (i.e., the core) and a surrounding optical medium (i.e., the cladding), the latter having a lower index of refraction. Light is channeled through the core. During transmission, the light often travels to the boundary of the core and cladding, where it is reflected back towards the core by total internal reflection However, total internal reflection is not total, as some of the light is lost, for example, due to scatter induced by imperfections within the core or at the core/cladding boundary.

To reduce this loss, a reflective layer can be applied over the surface of the cladding along the length of the fiber optic. The reflective layer significantly increases the amount of light directed back to the core, and improves the overall light transmission through the fiber optic.

Ideally, the reflective layer used in optical components should possess a high reflectance characteristic over a broad spectrum of light and over all incidence angles of reflectance. Silver is one metal known to possess a high reflectance value. Silver has a reflectance of about 98% over the entire visible light spectrum at normal incidence. Silver also sustains a high reflectance of about 96% for off-normal light at near grazing incidence angles. In comparison, aluminum, a more commonly used reflective-layer material, possesses a reflectance of about 93% at normal incidence. The reflectance of aluminum drops precipitously to 75% for light at grazing incidence angles Although silver possesses excellent optical characteristics, there are several problems associated with the use of the reflective metal. Silver has a tendency to undesirably tarnish when exposed to the atmosphere, especially in the presence of corrosive gases and contaminants, including sulfur dioxide, hydrogen sulfide, nitrogen dioxide, ozone, hydrogen chloride, chlorine, and organic acids. It is known that long-term performance of silver coatings is rarely, if ever, guaranteed by commercial coating facilities based on the aggressive nature of silver tarnishing brought on by ordinary exposure to the environment, along with the lack of suitably available protective measures which have been successfully tested under corrosive conditions.

Further, silver's adherence to optically transmissive substrate materials, including glass or polymeric materials such as polymethyl methacrylate, is moderate at best. Polymethyl methacrylate is a low-cost acrylic resin frequently used in the fabrication of optical components The use of silver coatings alone or in multilayer configurations with other metals having magnetic properties is also known in the art for providing shielding from electromagnetic interference (EMI). However, the use of silver coatings for EMI shielding applications has been limited by the susceptibility of silver coating to tarnishing and delaminating from an underlying substrate.

For the foregoing reasons, there is a need for an optical construction having a highly reflective coating that adheres favorably to a range of optically transmissive materials and that possesses improved resistance against corrosion and tarnishing to provide improved optically effective performance and longer lasting operating life Further, there is a long felt need in the art for methods and apparatus to provide highly conductive coatings or layers, typically comprising silver, possessing reduced susceptibility to tarnishing and/or delamination from an underlying supporting substrate, thereby enabling such highly conductive coatings or layers to be reliably used and maintained in EMI shielding applications.

SUMMARY OF THE INVENTION

The present invention is generally directed to an optical construction for optical components such as hollow and solid waveguides, solid and hollow light pipes, fiber optics, prisms, microstructured sheets, curved mirrors (ellipsoidal, parabolic, etc.), plano mirrors, and other optics having topographic forms. The optical construction of the present invention is designed to maintain high optical performance and light transmission through the optical component in the presence of potentially corrosive substances including sulfur dioxide, hydrogen sulfide, nitrogen dioxide, ozone, hydrogen chloride, chlorine, organic acids and the like, which are present in the atmosphere at least in trace amounts.

The optical construction of the present invention is especially useful in optical components where a highly reflective surface composed of a metal such as silver is desired. The optical construction is further adapted to provide favorable durability and preservation of the highly reflective surface in the optical component without measurably degrading the total reflectance qualities of the optical component.

In one aspect of the invention, the optical construction generally comprises an optically transmissive substrate adapted for efficiently channeling light therethrough with a highly reflective layer composed of a highly reflective metal deposited on the surface of the substrate, and bonded thereto. Overlying the highly reflective metal layer and firmly adherently bonded thereto is a protective layer comprised of a parylene polymer film.

The parylene polymer protective layer as used in the present invention serves to isolate the reflective layer from exposure to external elements such as ambient atmosphere, corrosive substances, salt, humidity and the like. Such external elements can cause the destruction and degradation of the metal reflective layer over time through tarnishing, breakdown, delamination, or discoloration, resulting in the loss of its reflectivity. The parylene polymer protective layer further improves the reflective layer's resistance to mechanical deformation and delamination as indicated by a tape-pull test described hereinafter.

Optionally, the optical construction of the present invention can further include an adhesion-promoting layer applied between the surface of the substrate and the reflective layer to strengthen the bond therebetween. The adhesion-promoting layer as used in the present invention significantly improves the adhesion between the functional reflective metal layer and the optically transmissive substrate for improved resistance against delamination where the reflective layer physically separates from the optically transmissive substrate resulting in degraded performance and reduction in reflectivity. Further, the adhesion-promoting layer promotes uniformity and consistency in reflective properties of the reflective layer along the substrate/reflective layer interface.

In an alternative form of the invention, a waveguide structure such as a fiber optic, comprising an optically transmissive glass or polymer material, is coated with an adhesion-promoting layer of the oxide form of a metal or metalloid. A silver reflective layer is applied in contact with the adhesion-promoting layer. A protective layer of a parylene polymer film is applied over the silver reflective layer to prevent the silver from losing its high reflective luster or from delaminating or degrading due to corrosive agents in the environment such as ambient air. The preferred form of the invention forms a robust highly reflective parylene/silver/metal-oxide/waveguide structure with improved performance qualities including longer operating life.

In another embodiment of the invention, an improved EMI shielding is provided by depositing a highly conductive coating or layer such as silver on an optional support substrate, followed by applying a protective layer comprising a polymer film over the highly conductive coating or layer, whereby the supporting substrate can be in any form including tubular material, sheet material, ribbon material, and so forth.

In yet another embodiment of the invention, a parylene polymer is applied over a layer of silver coating a substrate, for protecting the silver layer against tarnish and delamination, to maintain a reliable EMI shielding over an extended time period.

In yet another embodiment, layers of parylene on silver on metal-oxide are applied over a substrate to maintain a reliable EMI shielding over an extended time period.

In another embodiment of the invention, layers of polymer on silver on nickel are applied over a substrate to maintain a reliable EMI shielding over an extended time period.

In another embodiment of the invention, layers of polymer on silver on nickel on polymer are applied over a substrate to maintain a reliable EMI shielding over an extended time period.

BRIEF DESCRIPTION OF THE DRAWINGS

Various embodiments of the invention are described in detail below with reference to the drawings, in which like items are identified by the same reference designation, wherein.

DESCRIPTION OF THE INVENTION AND PREFERRED EMBODIMENTS

The present invention is generally directed both to optical constructions and methods for making such optical constructions, and to EMI shielding configurations and methods for making the same The optical construction embodiments are described first, and are followed by a description of the EMI shielding embodiments. The optical and shielding embodiments are related in certain aspects as described below.

The optical construction of the present invention includes a substrate, a highly reflective layer, an optional adhesion-promoting layer in contact between the substrate and the reflective layer, and a protective layer comprising a parylene polymer film overlaying the reflective layer. The optical construction of the present invention provides favorable optical qualities with improved adherence of the reflective layer to the substrate and improved resistance to corrosion and tarnishing for a longer operating life. The substrate material can be selected from the group consisting of glass and organic polymer-based materials such as polymethyl methacrylate (PMMA), for example.

In the present invention, the parylene polymer film, useful as a protective layer, has the following polymer repeat unit structure:

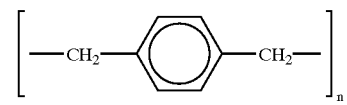

where "n" indicates the number of repeating units in the structure. The parylene polymer coating may be exemplified in three forms or variations, with each comprising varying degrees of chlorination. The three forms include parylene N as shown above with no chlorine atoms, parylene C which is produced from the same monomer as parylene N and is further modified by the substitution of a chlorine atom for one of the aromatic hydrogens, and parylene D which is produced from the same monomer as parylene N and is further modified by the substitution of two chlorine atoms for two of the aromatic hydrogens.

Figure 1:
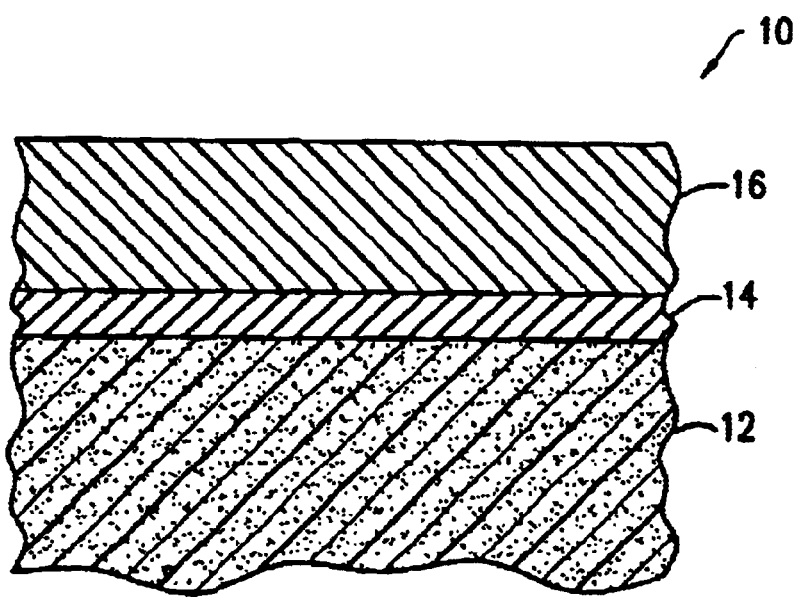
FIG. 1 is a cross sectional view of both an optical construction having a highly reflective layer illustrative of one embodiment of the present invention, and of an EMI shielding configuration including a highly conductive shielding layer for another embodiment of the invention.

With reference to FIG. 1, there is depicted an optical construction illustrative for one embodiment of the present invention. We note that the thickness of the corresponding elements in the construction are not drawn to scale, and is shown for illustrating the general structure and relationships thereof. The optical construction denoted herein by reference numeral 10, can be applied for the fabrication of a range of optical components where a highly reflective surface composed of a metal such as silver, is desired The optical construction 10 generally comprises an optically transmissive substrate 12 for efficiently transmitting and directing light therethrough, a reflective layer 14 preferably composed of a highly reflective metal such as silver vapor-deposited on the surface of the optically transmissive substrate 12, and a protective layer 16 preferably composed of a parylene polymer film. Preferably, the surface of the substrate 12 is optically smooth and substantially free from optical imperfections to provide the highest specular reflectance. The surface of the substrate 12 can be optionally treated to promote adhesion with the reflective layer 14 including, but not limited to, plasma treatment as described in U.S. Pat. No. 5,982,546, the content of which is incorporated herein by reference to the extent that there is no conflict.

The optically transmissive substrate used for fabricating optical components such as fiber optic waveguides can be selected from a range of materials depending, for example, on the application, the desired performance characteristics, the cost, and the characteristics of the transmitted light. The optically transmissive substrate 12 can be composed of glass or polymer material. The polymer materials can include organic polymers such as polyhydrocarbons, polyoxyhydrocarbons, polysulfohydrocarbons, and fluorocarbon and fluorohydrocarbon materials, as well Representative organic polymers include polyesters such as poly(ethyleneterephthalate) and poly(butyleneterephthalate), polyacrylates and methacrylates such as poly(methylmethacrylate) (PMMA), poly(methacrylate), and poly(ethylacrylate), copolymers such as poly(methylmethacrylate-co-ethylacrylate) and polycarbonates. Fluorocarbon polymers such as TEFLON and the various fluorohydrocarbon polymers known in the art can be used as well. More preferably, the polymer material is PMMA.

Other polymers can be used as optically transmissive substrate materials, particularly in applications where low birefringence is desired. Such polymers include CR-39 allyl diglycol carbonate resin marketed by PPG Industries of Pittsburgh, Pa.; OZ-1000 cycloaliphatic acrylic resin marketed by Hitachi Chemical Co, Ltd. of Tokyo, Japan; CALIBRE 1080 DVD polycarbonate resin marketed by Dow Engineering Plastics of Midland, Mich.; MAKROLON DP1-1265 polycarbonate resin marketed by Bayer Corporation of Pittsburgh, Pa., PLEXIGLAS VOD-100 acrylic molding resin marketed by ATOFINA Chemicals, Inc. of Philadelphia, Pa., TOPAS cyclo-olefin copolymer resin marketed by Ticona of Summit, N.J.; ZEONEX cyclo-olefin polymer resin marketed by Nippon Zeon Co., Ltd of Tokyo, Japan; and the like.

Although not a limitation to the application of this invention, the plastic or polymer material can be clear, transparent, and optically transmissive When used in context of plastic or polymer materials, the terms "clear", "transparent", and "optically transmissive" means a plastic or polymer that, in its configuration of use, exhibits transmission over a desired range of wavelengths. The polymer-based substrates themselves are commercially available or can be prepared by various art-known processes and do not, in and of themselves, constitute an aspect of this invention. The polymer substrates can be formed into solid bodies, sheets, films, or coatings applied or laminated onto nonpolymeric surfaces such as metal and glass The reflective layer 14 of the optical construction 10 shown in FIG. 1 is preferably made up of one or more functional metals that possess high reflectance values such as silver, copper, gold, palladium, iridium, rhodium, combinations in the form of alloys thereof, and the like. Among these metals, copper, silver, and gold are preferred, with silver being the most preferred metal for the visible range of light. The reflective layer 14 comprising a metal or an alloy of metals, can be deposited onto the optically smooth surface of the optically transmissive substrate 12 through conventionally known deposition methods such as cathode sputtering, vacuum evaporation or vapor-phase deposition techniques for a thickness ranging from about 100 Å to 10,000 Å, preferably 500 Å to 3,000 Å, and more preferably from about 1000 Å to 3,000 Å. Individual metals can be used, or a plurality of layers of different metals or layers of alloys of these metals can be used, if desired.

In another embodiment of the present invention, the reflective layer 14 of the optical construction 10 is enclosed and sealed from ambient by the protective layer 16 for optimal protection against corrosion and tarnishing. The protective layer 16, in the form of a parylene polymer film, is vapor deposited on the surface of the reflective layer 14 distal from the optically transmissive substrate 12. The parylene polymer protective layer 16, as applied, forms a continuously uniform coating as will be further described.

The parylene polymer film of the protective layer 16 can be composed of parylene N, parylene C, parylene D, or combinations or mixtures thereof. The parylene polymer film can be composed of an interpolymer of monomers of parylene variants of varying mixture ratios. The thickness of the parylene polymer film of the protective layer 16 is preferably at least 0.0001", more preferably in the range of from about 0.001" to 0.0001". We note that the actual thickness of and the mixture ratios of the variants in the parylene polymer protective layer can be adjusted according to the application, requirements, the reflective layer metal used, the desired effect, the duration of effect, and the types of expected contaminant exposures and the like, and may be readily determined by one skilled in the art.

The parylene polymer film can be optionally processed using suitable annealing or heat-treatment techniques to improve the chemical resistance and durability of the coating as will be described. The term "annealing" or "heat-treating" as used herein refers to any processes for treating a substance or material with heat followed by cooling to modify or alter the structural properties of the treated substance or material.

In accordance with the present invention, the parylene polymer film is applied through a coating process using conventionally known vapor phase deposition or vacuum evaporation deposition techniques. It is understood that the present invention can utilize any suitable commercially available method for applying parylene polymer on a surface as known by one skilled in the art.

As an illustrative example, one process for applying a parylene polymer coating is described in U.S. Pat. No.

3,342,754, the disclosure of which is hereby incorporated by reference in its entirety to the extent that no conflict exists. It is understood that the invention is not limited to the use of this process.

Figure 2:
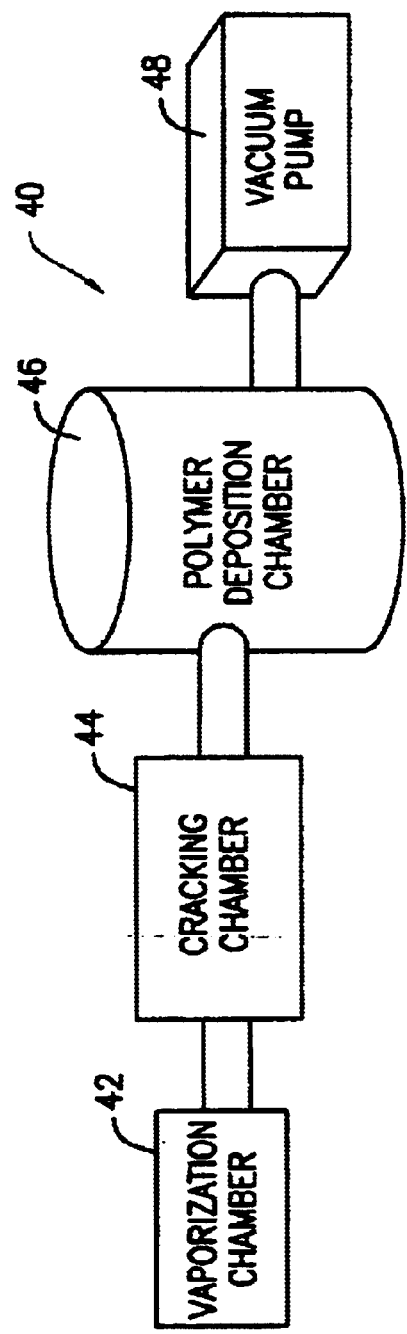
FIG. 2 depicts a schematic diagram of a parylene vacuum evaporation deposition reactor system for depositing a parylene polymer film to make an optical construction or EMI shielding in accordance with the principles of the present invention.

With reference to FIG. 2, a general schematic diagram of a basic parylene vacuum evaporation deposition reactor system 40 for carrying out the vacuum evaporation deposition process described in U.S. Pat. No. 3,342,754, is shown. As noted above, there are many known systems and processes known in the art for applying a polymer film on a substrate. The following description of system 40 provides an illustration of the process that may be used for coating a substrate with a parylene polymer layer. The system 40 can be constructed using commercially available components and parts as known by those skilled in the art.

With further reference to FIG. 2, the system 40 comprises a vaporization chamber 42, a cracking chamber 44, a deposition chamber 46, and a vacuum pump 48. The vacuum pump 48 operates to evacuate the air from the interior of the system 40. The vaporization chamber 42 is adapted to heat a sample of the di-p-xylylene dimer under vacuum at an elevated temperature sufficient to vaporize the dimer. Under vacuum conditions, the vaporized dimer radiates in all directions within the chamber 42.

The vaporized dimer proceeds to the cracking chamber 44 where the dimer is heated to a temperature of less than 700° C., preferably between 450° C. and 700° C., and more preferably at about 680° C. for a sufficient time at a pressure such that the vapor pressure is below 1.0 mm Hg, to form a parylene diradical monomer of parylene.

The parylene diradical monomer proceeds to the deposition chamber 46 where the diradical monomer condenses and polymerizes at a temperature of less than 200° C., preferably below the ceiling condensation temperature of the parylene diradical monomer, and more preferably at room temperature on the cooler surface of the reflective metal-coated optically transmissive substrate. The condensation of the diradical monomer yields a tough, linear, non-fluorescent polymer. The vacuum pump 48 is connected to the system 40 to ensure that the process is carried out in an evacuated atmosphere for optimal processing.

The vacuum evaporation technique of depositing parylene polymer provides several advantages The first is that the room temperature deposition process enables a range of substrates to be coated with parylene polymer films. The second is the formation of a highly conforming and uniformly continuous coating on substrates with complex shapes. The third is the capability to form very thin coating layers while remaining continuous and uniform for precise coating control.

With particular reference to FIGS. 1 and 2, the overall process of making the optical construction of the present invention will now be described. In a preferred form of the optical construction 10, the construction is formed by vapor depositing a silver layer 14 onto the optically smooth surface of a PMMA-based optically transmissive substrate 12. The reflective metal-coated optically transmissive substrate is placed into the deposition chamber 46 of the reactor 40, and suitably positioned for exposing the outer surface of the reflective silver metal 14 to the parylene diradical monomer flow. The parylene vacuum evaporation process produces a parylene polymer protective layer 16 of sufficient thickness on the surface of the silver metal layer 14. The thickness of the deposited parylene polymer protective layer 16 can be determined while in the deposition chamber 46 using any one of various optical methods known in the art. Alternatively, the thickness of the parylene polymer protective layer 16 can be determined after the article is removed from the deposition chamber 46

The above deposition process can be repeated at least once using the same or a different parylene variant (i.e., parylene N, parylene C, parylene D, and/or mixtures thereof) to produce a multilaminate parylene polymer coating on the surface of the reflective silver layer 14 as will be further described hereinafter. The deposition chamber 46 is sealed from ambient air, and the atmosphere of the chamber 46 is evacuated with the vacuum pump 48. Alternatively, the atmosphere in the deposition chamber 46 can be substituted at ambient pressure with an inert gas such as helium, argon or nitrogen.

We have discovered that by annealing the deposited parylene polymer protective film in the protective layer at an elevated temperature for a sufficient time, and allowing them to cool, a substantially improved chemically resistant parylene polymer barrier is formed. We have also discovered that the physical barrier and mechanical properties of the parylene polymer coating are greatly improved after the annealing thermal treatment. The annealing temperature can be at least 120° C., preferably from about 120° C. to 220° C. and the annealing time may range from about 1 hour to five (5) days. The annealing process can be carried out under suitable atmospheric conditions including, but not limited to vacuum, inert gas, and normal ambient atmosphere. The annealing conditions can be varied as required by the thermal mass of the substrate, the maximum substrate temperature rating, and the like, as may be determined by those skilled in the art.

The parylene polymer film can be annealed immediately after the completion of the parylene deposition process. The annealing process is preferably conducted in a vacuum, or in the presence of at least one inert gas such as helium, argon, nitrogen, and the like, at atmospheric pressure. The optimal annealing conditions may differ slightly between each variant of the parylene polymer. We further note that the annealing process may be utilized on each parylene polymer protective layer individually as applied during the vapor deposition process, or on the parylene polymer protective layer as a whole after applying more than one parylene polymer layer.

Figure 3:
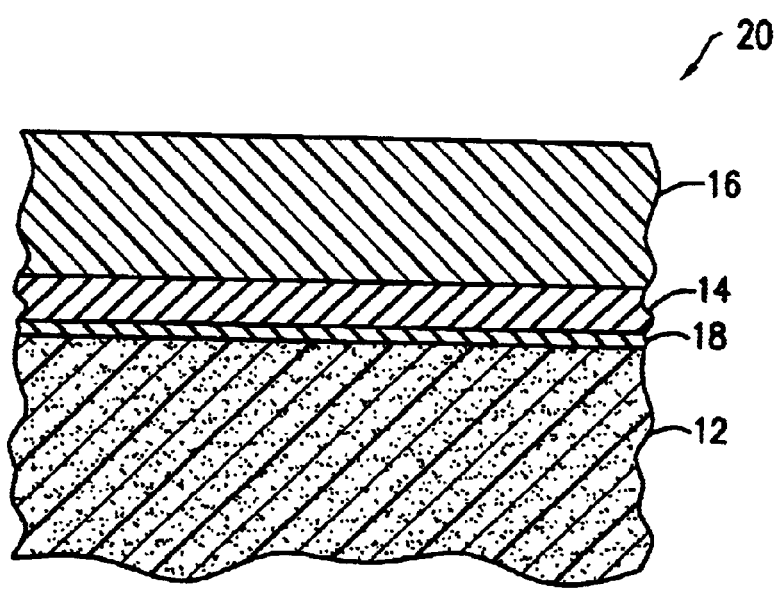
FIG. 3 is a cross sectional view representative both of an optical construction having a highly reflective layer, and of an EMI shielding configuration for second and third embodiments, respectively, of the present invention.

In another embodiment of the present invention as shown in FIG. 3, there is provided an optical construction 20 which is not drawn to scale, comprising an optically transmissive substrate 12 as described above and a thin adhesion-promoting layer 18 comprising the oxide form of at least one metal or metalloid that is applied to the substrate surface using conventional deposition processes such as vacuum evaporation, cathode sputtering, electron beam evaporation, and the like. The adhesion-promoting layer 18 is applied to the substrate 12 prior to the application of the reflective layer 14. Details describing the use of aluminum oxides for enhancing the adhesion of silver to glass substrates, is found in Hass et al., Applied Optics, 14, 2639 (1975), the content of which is incorporated herein by reference.

The reflective layer 14 comprising a highly reflective metal such as silver is deposited, using methods described above including electron beam evaporation, onto the surface of the adhesion-promoting layer 18 for a thickness sufficient to form an opaque, highly reflective surface at the interface between the substrate 12 and the reflective layer 14. Finally, the surface of the reflective layer 14 is coated with a protective layer 16 comprising a parylene polymer film preferably using the vacuum evaporation deposition or suitable process as described above.

As noted above, the adhesion-promoting layer 18 preferably comprises the oxide form of at least one metal or metalloid that is sufficient to bond the metal atoms of the reflective layer 14 to the smooth surface of the optically transmissive substrate 12. Preferably, the thickness of the adhesion-promoting layer 18 can range from about 10 Å to 1000 Å, and more preferably about 300 Å. The use and application of metal- and metalloid-based oxides (collectively referred hereinafter as "metal oxides") as adhesion promoting materials between a metal and a polymer substrate is further described in U.S. Pat. Nos. 5,589,280 and 5,902,634, the pertinent teachings of both are incorporated herein by reference to the extent that there is no conflict.

For most applications, any of the adhesion-promoting materials selected should be as nearly colorless as possible, at least in the amounts found effective to provide reliable adhesion. An adhesion-promoting material that imparts a visually detectable color to the substrate 12 under the desired illuminant not only reduces the efficiency of reflection by absorbing light passing to and from the reflective layer 14 but also changes the color value of the light rays directed at the reflective layer 14 through the substrate 12. We note that the adhesion-promoting material, in addition to promoting adhesion of the metallic reflective layer 14 to the substrate 12, must resist corrosion to maintain its optical qualities. We further note that the selection of the materials for the adhesion-promoting layer must also take into account the effects of the relative expansion coefficients in order to preclude undesirable effects including delamination resulting from cyclic temperature changes.

In one embodiment of the present invention, the adhesion-promoting layer 18 which is positioned between the optically transmissive substrate 12 and the reflective layer 14, is composed of the oxide form of one or more metals including, but not limited to hafnium, zirconium, tantalum, titanium, niobium, silicon, tungsten, aluminum, vanadium, molybdenum, chromium, tin, antimony, indium, zinc, bismuth, cadmium, nickel and the like.

Generally, the method for producing the adhesion-promoting layer 18 is to deposit the metal oxide via cathode sputter deposition, electron beam evaporation deposition or any suitable process for depositing metal oxides. The metal oxides are preferably deposited in the oxidized mode, which may be achieved for example by sputtering in the presence of an excess of oxygen so that the metal is fully oxidized, to attain the desired adhesion promotion.

Since some of the metals considered here for the adhesion-promoting layer 18 exhibit substantial absorption in their metal state (i.e., >3% absorption at thicknesses less than 20 Å), it is advantageous to deposit them as oxides. Similarly, it may also be advantageous to up-oxidize the metal layers fully or partially after their deposition.

Figure 4:
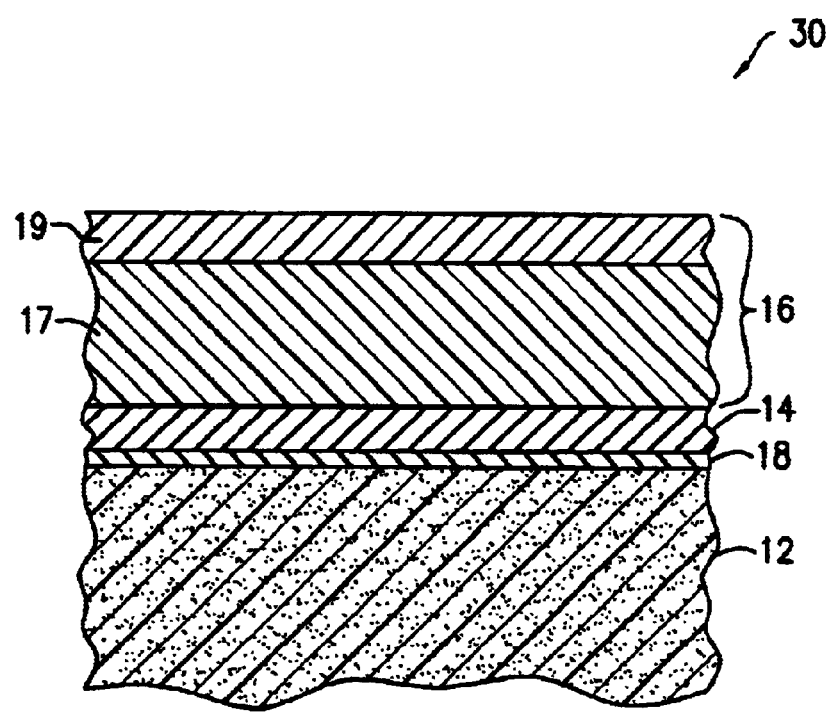
FIG. 4 is a cross sectional view representative both of an optical construction having a highly reflective layer, and of an EMI shielding configuration for fourth and fifth embodiments, respectively, of the present invention.

Referring to FIG. 4, an optical construction is depicted for a third embodiment of the invention. The optical construction denoted herein as reference numeral 30 is similar to the optical construction 20 of FIG. 3 previously described above. We again note that the thickness of the corresponding elements in the construction are not drawn to scale, and is shown for illustrating the general structure and relationships thereof. In the present embodiment, the optical construction 30 includes a protective layer 16 that is composed of a multilaminate structure with each layer being composed of a distinct parylene polymer selected from the group consisting of parylene N, parylene C, parylene D and combinations or mixtures thereof. The multilaminate form of the protective layer 16 provides benefits of each parylene variant and/or mixtures of parylene variants for improved comparability with the reflective metal layer, chemical resistance and the like The protective layer 16 includes first parylene film 17 composed of a first parylene variant or mixtures of parylene variants. The first parylene film 17 is deposited on the reflective layer 14 using one of the suitable deposition methods described above The protective layer 16 further includes a second parylene film 19 composed of a second parylene variant or mixtures of parylene variants overlaying the surface of the first parylene film 17 distally from the reflective layer 14. The actual thickness of each parylene variant layer can be adjusted according to the application requirements, the reflective layer metal, the desired effect, the duration of effect, and the types of expected contaminant exposures and the like, and may be readily determined by one skilled in the art.

In one embodiment, the first parylene film 17 is composed of parylene C, and the second parylene film 19 is composed of parylene D. We have determined from experimental results that when parylene C was deposited as a protective layer directly on the silver reflective layer, the change in silver reflectance at the parylene/silver interface, was observed to be within the noise of the experimental data. The findings indicated that there is little or no reactivity between parylene C and silver.

We have further determined from experimental results that when parylene D was deposited on the silver layer as a protective layer, the silver reflectance at the parylene/silver interface, was measurably diminished or degraded. Since parylene D is known to possess on average a chlorine content of two chlorine atoms per monomer unit, we theorize that the presence of unbonded or trapped chlorine in the parylene polymer film may be reacting with the silver. Although the findings indicated that there may be some reactivity between parylene D and silver, parylene D is a suitable candidate for use as part of the protective layer. Parylene D is known to have a lower gas permeability value than parylene C for better exposure protection of the silver reflective layer. The silver/parylene C/parylene D laminate combination provides an effective protective layer, which possesses the low reactivity with silver of parylene C, and the low gas permeability of parylene D In yet another embodiment, the transitioning of the deposition of parylene films from one parylene variant to another, can be made gradually to form a transitional interlayer (not shown) between the first and second parylene polymer layers. As the deposition of the parylene variants transitions, the vapor flow of the first parylene polymer is gradually reduced while the vapor flow of the second parylene polymer is ramped up in proportion to the corresponding reduction of the first parylene polymer vapor flow. This action produces a graded interface between the pure parylene polymer layers and forms an interpolymer with improved adhesion therebetween. We note that the resulting parylene polymer layer can be annealed or heat-treated as desired to modify the properties of layer as described above.

It is understood that the actual thickness of the interlayer can be adjusted according to the application, requirements, the desired effect, the duration of effect, and the types of expected contaminant exposures and the like, and may be readily determined by one skilled in the art.

Figure 5:
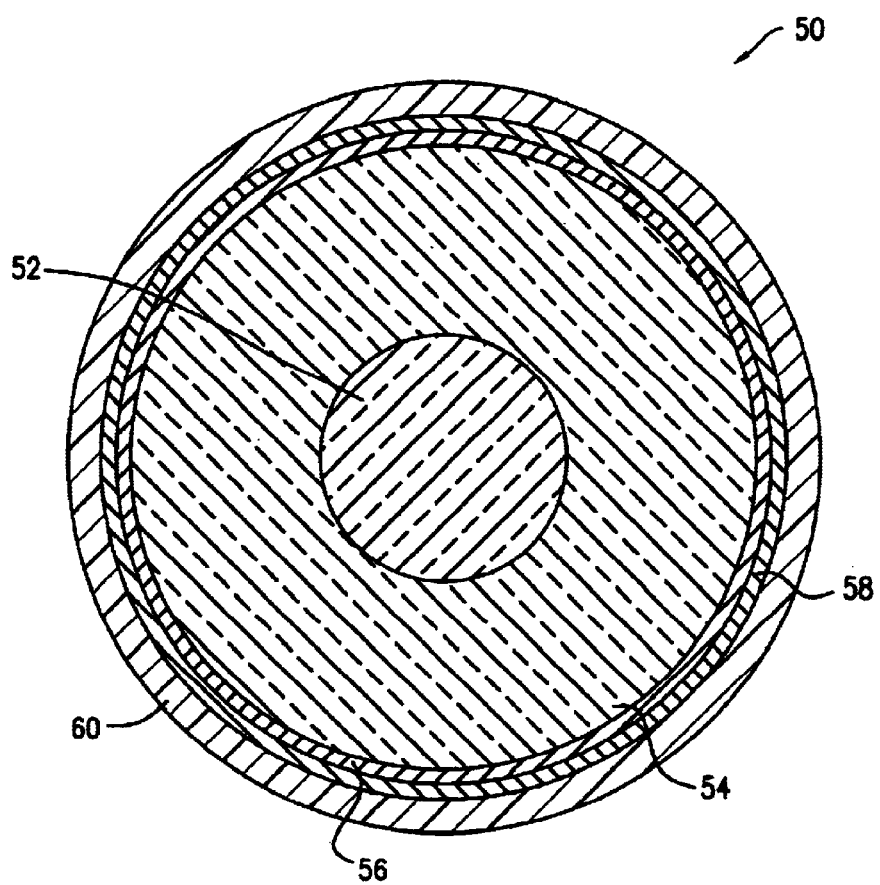
FIG. 5 is a cross sectional view of a fiber optic waveguide comprising the optical construction in accordance with the present invention.

Referring to FIG. 5, a fiber optic waveguide is depicted for one illustrative embodiment of the present invention. The fiber optic waveguide denoted generally by reference numeral 50, generally comprises an elongated cylindrical body having concentric layers of glass for channeling light therethrough. The fiber optic waveguide 50 of FIG. 5 comprises a core 52 composed of an optically transmissive glass or polymer material, a cladding 54 composed of an optically transmissive glass or polymer material with a lower refractive index than the core 52, a reflective layer 58 with an optional adhesive-promoting layer 56 interposed between the reflective layer 58 and the cladding 54, and a parylene polymer protective layer 60 overlaying the reflective layer 56. The fiber optic 50 includes the optical construction of the present invention where the cladding 54 establishes the optically transparent substrate. The fiber optic 50 can be fabricated from any commercially available fiber optic waveguide while using the above-described techniques for applying the reflective layer 58, the optional adhesion-promoting layer 56, and parylene polymer layer 60, all onto the surface of the cladding 54.

EXAMPLE 1

Experimental Tests

We obtained samples of optical quality polymethyl methylacrylate (PMMA) substrates with a reflective index of 1.49 for testing. An aluminum oxide coating was evaporatively applied to one set of samples using conventional electron beam evaporation deposition process to form an adhesion-promoting layer. The aluminum oxide source having a purity of 99.999%, was obtained from Cerac of Milwaukee, Wis. The aluminum oxide was deposited using a flow of 21.8% $O_2$/Ar at a total pressure of $2\times10^{-4}$ Torr. The deposition rate was set at approximately 1 Å per second to produce a final thickness of about 300 Å.

A layer of silver metal was applied to the surface of each sample substrate using a conventional electron beam evaporation deposition process. The silver metal source having a purity of 99.999%, was obtained from Cerac. The silver layer was applied at a thickness of 1,000 Å at a deposition rate of from about 1.2 to 7.3 Å per second The average deposition rate was about 3 Å per second.

Parylene D and C were each obtained from Paratronix, Inc. of Attleboro, Mass. The parylene polymers were applied to the samples using chemical deposition processes resulting in a coating of about 0.0005". The degree of protection the parylene polymer layer provided was measured by the changes in reflectance of the silver layer through the substrate. Reflectance measurements were made using a Mac-Beth Color-Eye 7000 spectrometer with a spectral range of from about 360 to 750 nm Measurements at the interface were made through the PMMA substrate, and will include any absorption due to the PMMA or interference effects from the first surface reflectance Accelerated silver tarnishing was induced by placing the sample in a sealed 200 mm diameter Pyrex glass desiccator containing normal ambient air and a evaporation dish holding 2 cc of ammonium sulfide (20% aqueous solution) in 18 cc of deionized water. The ammonium sulfide was obtained from Strem Chemicals of Newburyport, Mass. The samples of substrates were positioned 4 cm above the solution with the silver layer side exposed to the solution. The silver reflectance was measured as a function of the exposure time in the desiccator chamber. The ammonium sulfide solution generated hydrogen sulfide as the primary corrosion agent. We had observed that elemental sulfur had deposited on the desiccator walls after long exposure times. Ammonium sulfide solution is known to be one of the most aggressive tarnishing agent of silver. See, Dar-Yuan Song et al., Applied Optics 24 (8), 1164 (1985)

Ambient Air Results

In order to estimate the rate of silver corrosion in ambient air for an unprotected sample, the reflectance of a silver coated PMMA sample was measured periodically when exposed to the ambient air of the laboratory. The change in reflectance of the silver surface and the silver/PMMA interface as measured through the optically transmissive PMMA substrate was recorded for each sample. The reflectance was measured using light with a wavelength of about 550 nm extending over a period of about 70 days. The points were plotted and linear regression analysis was executed to generate a graph depicted in FIG. 6.

Figure 6:
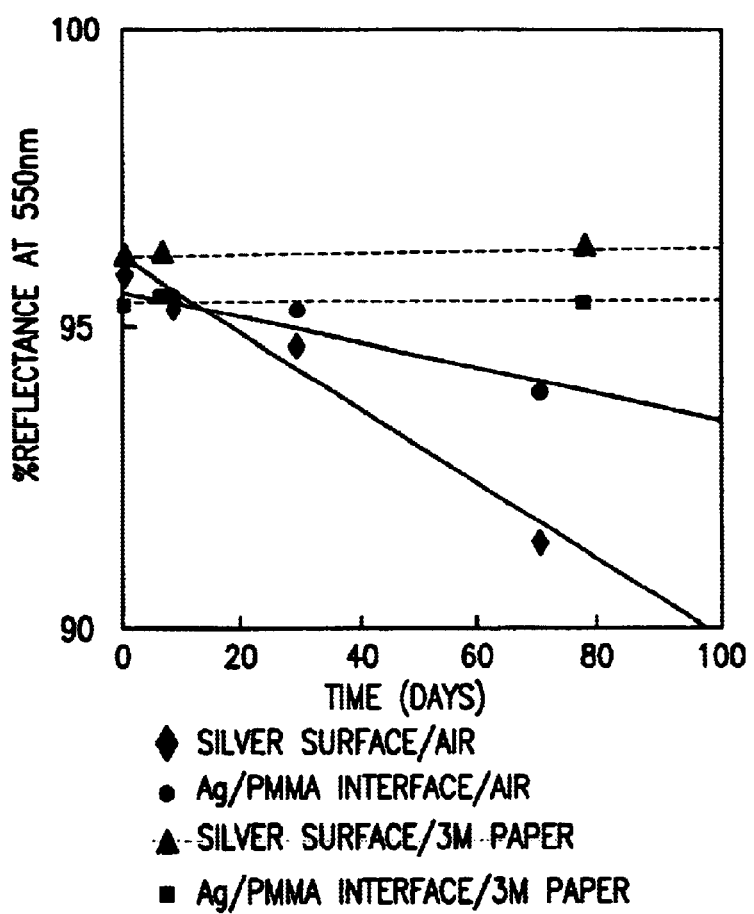
FIG. 6 is a graph plotting the silver corrosions rates for various samples exposed in the presence of ambient air.

With reference to FIG. 6, the graph shows that the ambient air exposure resulted in tarnish rates of about $6.3\times10^{-2}$%/day for the silver surface, and about $2.2\times10^{-2}$%/day for the silver/PMMA interface. We believe that the lower tarnish rate at the interface as compared to the silver surface can be explained in that the diffusion of corrosion agents through the silver layer, or less likely, through the much thicker PMMA substrate was slower. Included in the graph are reflectance measurements for samples (control) that had been stored in 3M Corrosion Control Absorber Paper (CPAP), an anticorrosion paper product of Minnesota Mining and Manufacturing Co. of St Paul, Minn. The anticorrosion paper is designed to prevent tarnishing from the presence of air contaminants that cause oxidation and corrosion. When the corrosive elements were removed from the air by the anticorrosion paper, both the silver surface and the silver/PMMA interface showed no measurable change in reflectance. The change of reflectance was less than $3\times10^{-4}$%/day over the 70 day measurement period. Comparing the two sets of data, we can conclude that the changes in silver reflectance were produced by air corrosion alone, and there appeared to be no perceptible interaction of the silver mirror with the PMMA substrate at the interface.

Ammonium Sulfide

To test the ability of parylene coatings to inhibit the tarnish of silver, several silver coated PMMA samples were prepared in the manner as described above. The PMMA samples were encapsulated with films of both C and D variants of parylene. The parylene polymer coated PMMA samples were obtained from Paratronix Inc., Attleboro, Mass. The film thickness of the parylene coatings was measured to be on average of about 0.00043"

Figure 7:
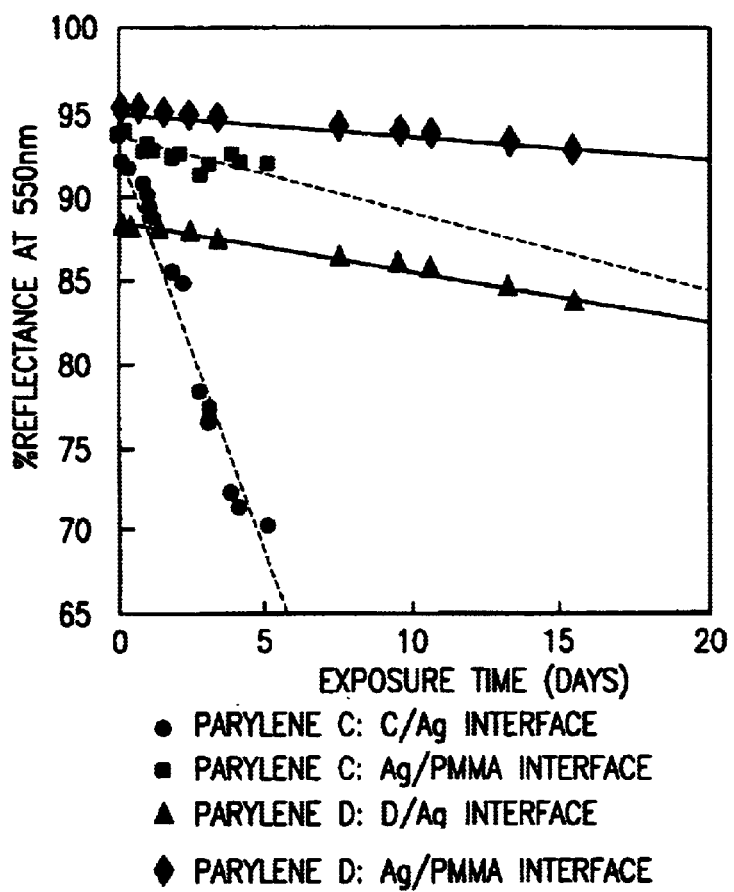
FIG. 7 is a graph plotting the silver corrosion rates for various samples exposed in the presence of an ammonium sulfide solution.

Using the test procedure described above, the effectiveness of parylenes coatings C and D were evaluated. Changes in silver reflectance as a function of exposure time in the corrosion chamber were measured and the results are shown in FIG. 7. Referring to FIG. 7, the samples were each exposed to ammonium sulfide solutions The corrosion rates were determined from data analyses using linear least-square fits. The corresponding corrosion rates for exposure to ambient air and ammonium sulfide are listed below in Table 1.

TABLE 1

Silver Tarnish Rates Determined from Reflectance Measurements at 550 nm

| Protective Film | Silver Tarnish Rate (%/day at 550 nm) | | Corroding Agent |
| --- | --- | --- | --- |
| | Ag Surface | Ag/PMMA Interface | |
| None | 0.063 | 0.022 | Air |
| None | $7.1 \times 10^4$ | $5.3 \times 10^3$ | Ammonium sulfide |
| Parylene C | 4.9 | 0.50 | Ammonium sulfide |
| Parylene D | 0.33 | 0.17 | Ammonium sulfide |

Comparing the tarnish rates through the parylene C and D films, we had observed that the tarnish rate for the parylene C was fifteen times higher than the rate for parylene D Comparing the tarnish rates for parylene protected samples to the unprotected silver samples, we had observed that the tarnish rate was reduced by a factor of $6.9 \times 10^{-5}$ for the parylene C coating and a factor of $4.6 \times 10^{-6}$ for the parylene D coating. Assuming that similar corrosion agents are responsible for the ambient air tarnish results, the above tarnish reduction factors can be used to estimate a tarnish rate for parylene polymer protected silver in normal atmospheric air. Applying the tarnish reduction factors to the ambient air data results in an estimated air tarnish rate of about $4.3 \times 10^{-6}$%/day for a parylene C protected silver film, and an estimated air tarnish rate of about $2.9 \times 10^{-7}$%/day for parylene D. Based on this analysis, either of the parylene variants would protect silver for 50 years with less than a 0.1% change in reflectance.

The measured tarnish rates at the silver/PMMA interface listed in Table 1 are at all times lower that those from the silver surface This result is expected since there is the added requirement for the corrosion gases to diffuse through the silver layer to reach the silver/PMMA interface.

Silver Adhesion

Parylene C and D films were deposited directly onto PMMA to test the adhesion of these films. Several samples of each variant were tested with SCOTCH™ tape marketed by Minnesota Mining and Manufacturing. Co. of, and were observed to be adherent to the substrate with no instances of the parylene film removal by the tape pulls.

Although silver appears to be compatible with PMMA when in direct contact, the adhesion to this material is marginal. SCOTCH™ tape tests of silver coatings on PMMA consistently removed all of the silver film. Encapsulation of the silver coated PMMA substrates with parylene, as would be done for the final silver coated waveguide structure, does improve the robustness of the silver coating.

Due to the high tensile strengths of the parylene films, silver films on PMMA that have been coated with either parylene C or parylene D will usually pass the SCOTCH™ tape test without any film delamination. However, in some instances blisters can be seen in the film after the pull test indicating areas where the silver film has detached from the PMMA substrate. The parylene film, however, remains intact and well-bonded to the underlying silver film. These failures confirmed the need to improve the silver/PMMA interfacial bond.

As detailed previously, metal- or metalloid-oxides are known to enhance the adhesion of silver to glass substrates. Alumina was chosen since it is also an excellent candidate for the silver coated waveguide application due to its high transparency throughout the visible spectrum. In order to test alumina as an adhesion layer for silver on PMMA, a 300 Angstrom-thick layer was deposited on PMMA prior to deposition of the silver mirror. SCOTCH™ tape tests indicate that the alumina interfacial layer improves the silver adhesion. Approximately 80% of the tape pulls resulted in no loss of silver film with 20% of the pulls removing a portion of the silver mirror from the PMMA substrate. Once alumina-bonded silver films were overcoated with parylene C, no removal or delamination of the silver mirror from the substrate was observed from tape test pulls.

The above-described detailed description of the invention is mainly concerned with embodiments of the invention associated with optical constructions. The various methods for the optical construction embodiments are also applicable for use in providing a electrically conductive shielding layer typically composed of silver, in EMI shielding applications, as will now be described.

As indicated above, it is known in the art that silver provides a very high efficiency electrical conductor, and a shield for electrode magnetic interference (EMI). The effectiveness of silver for providing an EMI shield in comparison to aluminum and copper has been established in the art. For example, reference is made to a report entitled "Vacuum Deposition Shielding Effectiveness Test," prepared by Kimmel Gerke Associates, Ltd., Consulting Engineers, appearing in EMI/EMC, March, 1990 (See http://www Shielding for electronics.com/effectiveness.html). This Report provides test results that show that vacuum deposited silver performs better than any other metal against which it was tested for providing an EMI shield. Accordingly, it is clear that silver coatings can greatly enhance the EMI effectiveness of enclosures, printed wiring boards or circuit boards, gaskets, cabling, fabrics, and so forth.

It will be shown that the present invention also includes embodiments for combining silver in multilayer arrangements with metals having magnetic properties, such as nickel, for providing both electrical, and electromagnetic shielding properties. Also, it is known that silver is a good conductor of electricity, and as such silver coatings can also be used for enhancing the current-carrying capacity of conductors. For example, silver has a resistivity of 9.8 ohms per circular mil-foot, as compared with copper at 10.4 and aluminum at 17.0. The embodiments of the invention providing for effective use of silver and EMI shielding are believed to be commercially important, in recognition of the recent trend to change from aluminum to copper for use in semiconductor interconnections, which trend may soon lead to a transition from copper to silver.

With further reference to FIG. 1, in EMI shielding applications for a device in need of EMI shielding, the construction 10 is representative of an EMI shield construction comprising an electrically conductive shielding layer 14 composed of an electrically conductive material such as silver, copper, nickel and the like, optionally supported on a substrate 12. The substrate 12, rather than being an optically transmissive substrate as indicated above for optical construction embodiments, is composed of any material, preferably an electrically insulating material such as plastic, elastomers, and the like. The substrate 12 can be used to support the electrically conductive shielding layer 14 or used to electrically isolate the device being EMI shielded from the conductive shielding layer 14 as will be further described hereinafter. The substrate 12 can also be representative of the material used for enclosures for electrical and electronic equipment, printed circuit boards, gaskets, electrical cables, fabrics, and so forth. Note that EMI theory and EMI shielding for printed circuit boards and the like, are described in U.S. Pat. No. 5,639,989. Also, EMI shielded enclosures for electrical and electronic components, and methods of constructing the same are described in U.S. Pat. No. 5,473,111. The teachings of these patents are incorporated herein by reference to the extent that they do not conflict with the teachings of the present Application.

As further shown in FIG. 1 hereof, the conductive shielding layer 14 can be deposited or bonded onto the substrate 12 through conventional application techniques including, but not limited to, conductive paints, flame spraying, vacuum metallization, electroless plating, flake-filled molding materials, sputter deposition, chemical vapor deposition process including plasma enhanced chemical vapor deposition, and the like. A protective layer 16, provided in the form of a continuously uniform coating of parylene polymer, is applied onto the conductive shielding layer 14 using the same techniques as described above for the optical construction embodiments. The parylene vacuum evaporation deposition reactor system 40, as shown in FIG. 2 and described above, is also applicable for use in the present embodiments of the invention associated with EMI shielding.

With further reference to FIG. 3, the adhesion-promoting layer 18 can also be used in the EMI shielding configuration embodiments for the present invention. Similarly, the embodiments of the invention for an optical construction as shown in FIG. 4, are also applicable for use in the embodiments in the invention associated with using silver as an EMI shielding material. The difference being that the substrate 12 will typically not be an optically transmissive substrate, but will otherwise be representative of sheet material, ribbon material, tubular material, or other suitable material as used in applications requiring effective and reliable EMI shielding. Otherwise, the layers 14, 16, 17, 18, and 19, are as described and taught above for optical construction embodiments.

Figure 8:
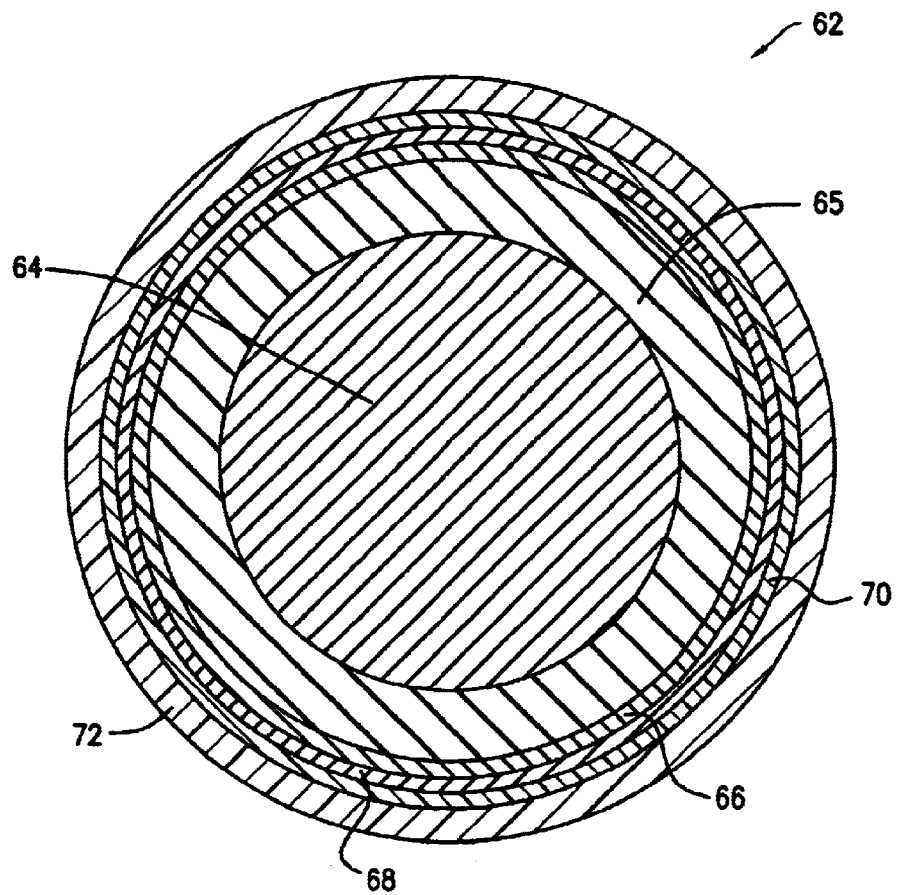
FIG. 8 is a cross sectional view of an electrical cable including an EMI shielding construction in accordance with an embodiment of the invention.

In FIG. 8, an electrical cable including EMI shielding is shown for another embodiment of the invention The electrical cable with EMI shielding configuration 62 includes a center electrical conductor 64 comprising an electrically conductive material such as copper, for example. The conductor 64 is enclosed within a dielectric or electrically insulating layer 65 composed of an electrically insulating material including, but not limited to, thermoplastic resins such as epoxy resins, polyester resins, polyurethane resins, polyvinyl alcohol resins, vinyl chloride resins, vinyl ester resins, acrylic resins, epoxy acrylate resins, diaryl phthalate resins, phenolic resins, polyamide resins, polyimide resins, melamine resins; plastic polymers such as polyvinylchloride (PVC), polyethylene, and the like; elastomers such as rubber; and the like The insulating material is preferably made of a flexible material so as to decrease the possibility of breakage of the insulating layer 65 during bending of the coaxial cable 62.

The insulating layer 65 can be optionally covered with an adhesion-promoting layer 66. A conductive shielding layer 68 is deposited over the insulating layer 65. The conductive layer 68 comprises an electrically conductive material such as silver and nickel, for example, suitable for providing EMI and RF shielding of the center conductor 64. The conductive layer 68 can be in the form of a continuous seamless sheath, a braided sleeve or any other suitable form as known in the art.

A protective layer 70 comprising a parylene polymer encloses the conductive shielding layer 68 using techniques described above. An electrically insulating and abrasion resistant layer 72 overlays the parylene polymer protective layer 70. The abrasion resistant layer 72 can be composed of any electrically insulative material that is flexible and resilient, including, but not limited to, plastic, silicon rubber and the like, suitable for protecting the inner portions of the cable 62 from the environment, temperature fluctuations and physical rigors.

The construction of the cable can be achieved through conventional methods. A preferred method includes covering the center conductor 64 with the insulating layer 65 through the application of an extrudable insulating material such as silicone. Over this, the conductive shielding layer 68 typically composed of silver, for example, can be deposited onto the insulating layer 65 through methods described above and as known in the art. Copper, nickel or other highly conductive material may also be used for the conductive shielding layer 68.

Alternatively, the insulating layer 65 can be composed of a plastic material such as PVC, for example, with the conducting shielding layer 68 laminated or bonded to the insulating layer 65. The conductive layer 68 can be sputter deposited onto the insulating layer 65 to form a seamless coating for an effective EMI shield. Connection of the conductive shielding layer 68 can be readily achieved by use of conductive adhesive or 360° ferrule crimps, thus enabling the cable 62 to be attached to connectors Such methods of connecting the conductive shielding layer 68 (e.g., silver) of the cable 62 are known in the art, and are specifically taught, for example, in U.S. Pat. No. 6,211,459, the content of which is incorporated herein by reference to the extent that no conflict with the teachings in the present Application exists.

It is further noted that the contact of silver with an incompatible dissimilar metal such as, for example, where a silver-based shielding layer is electrically connected to a system ground through open-close contacts, plugs or receptacles, can result in galvanic corrosion. Therefore, for optimal use of the present invention, it is important to properly select a dissimilar metal that is compatible with silver, if contact between the two is anticipated. Suitable dissimilar metals include rhodium, palladium, gold, nickel, copper and the like. Details on proper treatment of contacts or selection of metals suitable for use with silver are described in MIL-STD-889B ("Dissimilar Metals"), the content of which is incorporated herein by reference to the extent it does not conflict herewith.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. An EMI shielded electrical cable including a centrally located electrical conductor comprising:
    an electrically insulating layer formed around the electrical conductor;
    an electrically conductive layer deposited on said electrically insulating layer; and
    a protective layer composed of a parylene polymer film deposited on said electrically conductive layer, wherein the parylene polymer film comprises a layer of parylene C in contact with the electrically conductive layer, and a layer of parylene D in contact with the layer of parylene C.

2. The EMI shielded electrical cable of claim 1, further comprising an adhesion-promoting layer comprising an oxide form of at least one metal or metalloid deposited between said insulating layer and said electrically conductive layer.

3. An optical construction comprising:
    an optically transmissive substrate;
    a reflective layer composed of a highly reflective metal overlaying the optically transmissive substrate, and bonded thereto; and
    a protective layer composed of a parylene polymer film bonded to the reflective metal layer, wherein the parylene polymer film comprises a layer of parylene C in contact with the reflective layer, and a layer of parylene D in contact with the layer of parylene C.

4. The optical construction of claim 3, further comprising an adhesion-promoting layer deposited between the optically transmissive substrate and the reflective layer for increasing the strength of the bond therebetween.

5. The optical construction of claim 4, wherein the adhesion-promoting layer comprises a thickness of from about 10 Å to 1000 Å.

6. The optical construction of claim 4, wherein the adhesion-promoting layer is composed of the oxide form of a metal or metalloid.

7. The optical construction of claim 6, wherein the metal or metalloid of the adhesion-promoting layer is selected from the group consisting of aluminum, hafnium, zirconium, tantalum, titanium, niobium, silicon, tungsten, vanadium, molybdenum, chromium, tin, antimony, indium, zinc, bismuth, cadmium, and nickel.

8. The optical construction of claim 6, wherein the metal of the adhesion-promoting layer is aluminum.

9. The optical construction of claim 3 wherein the highly reflective metal is selected from the group consisting of silver, copper, gold, palladium, iridium, rhodium, and combinations in the form of alloys thereof.

10. The optical construction of claim 3, wherein the highly reflective metal is silver.

11. The optical construction of claim 3, wherein the optically transmissive substrate is composed of glass or a polymer material.

12. The optical construction of claim 11, wherein the polymer material of the optically transmissive substrate is selected from the group consisting of polyhydrocarbons, polyoxyhydrocarbons, polysulfohydrocarbons, fluorocarbons and fluorohydrocarbons, polyesters, poly(ethyleneterephthalate), poly(butyleneterephthalate), polyacrylates methacrylates, poly(methylmethacrylate) (PMMA), poly(methacrylate), poly(ethylacrylate), copolymers, poly(methylmethacrylate-co-ethylacrylate), and polycarbonates, and CR-39 allyl diglycol carbonate resin, OZ-1000 cycloaliphatic acrylic resin, CALIBRE 1080 DVD polycarbonate resin, MAKROLON DP1-1265 polycarbonate resin, PLEXIGLAS VOD-100 acrylic molding resin, TOPAS cyclo-olefin copolymer resin, ZEONEX cyclo-olefin polymer resin, and combinations thereof.

13. The optical construction of claim 11, wherein the polymer material of the optically transmissive substrate is poly(methylmethacrylate).

14. The optical construction of claim 3, wherein the highly reflective layer comprises a thickness of from about 100 Å to 10,000 Å.

15. The optical construction of claim 3, wherein the parylene polymer film further comprises an interlayer of parylene C and parylene D between the layer of parylene D and the layer of parylene C.

16. The optical construction of claim 3, wherein the protective layer comprises a thickness of from about 0.001" to 0.0001".

17. The optical construction of claim 3, wherein the substrate comprises a fiber optic waveguide.

18. The optical construction of claim 3, wherein the protective layer composed of the parylene film is annealed or heat-treated.

19. An optical construction comprising:
an optically transmissive substrate;
an adhesion-promoting layer comprising the oxide form of at least one metal or metalloid deposited onto the surface of the optically transmissive substrate;
a reflective layer composed of a highly reflective metal; and
a protective layer composed of a parylene polymer film in bonded contact with the reflective metal layer, wherein the parylene polymer film comprises a layer of parylene C in contact with the reflective layer, and a layer of parylene D in contact with the layer of parylene C.

20. An EMI shield construction for a device, comprising:
an electrically conductive layer, surrounding said device; and
a protective layer composed of a parylene polymer bonded to said electrically conductive layer, wherein said parylene polymer comprises a layer of parylene C in contact with the electrically conductive layer, and a layer of parylene D in contact with the layer of parylene C.

21. The EMI shield construction of claim 20, further comprising an insulating layer located between the electrically conductive layer and the device.

22. The EMI shield construction of claim 21, further comprising an adhesion-promoting layer deposited between the insulating layer and the electrically conductive layer for increasing the strength of the bond between the insulating layer and the electrically conductive layer.

23. The EMI shield construction of claim 22, wherein the adhesion-promoting layer consists of an oxide form of a metal or metalloid.

24. The EMI shielded construction of claim 23, wherein said metal or metalloid of the adhesion-promoting layer is selected from the group consisting of aluminum, hafnium, zirconium, tantalum, titanium, niobium, silicon, tungsten, vanadium, molybdenum, chromium, tin, antimony, indium, zinc, bismuth, cadmium and nickel.

25. The EMI shield construction of claim 22, wherein the metal of the adhesion-promoting layer consists of aluminum.

26. The EMI shield construction of claim 20, wherein the electrically conductive layer comprises an electrically conductive material selected from the group consisting of silver, copper, nickel, and combinations thereof.

27. The EMI shield construction of claim 20, wherein the electrically conductive material is silver.

28. The EMI shield construction of claim 20, wherein said device is an electrical cable including a central conductor surrounded by an electrical insulating material whereby said electrically conducting layer consists of silver.

29. The EMI shield construction of claim 20, wherein the parylene polymer further comprises an interlayer of parylene C and parylene D between the layer of parylene D and the layer of parylene C.

30. The EMI shield construction of claim 20, wherein the parylene polymer of the protective layer is annealed or heat-treated.

31. The EMI shield construction of claim 20, further comprising an insulating layer covering the protective layer.

32. A method for making an EMI shield construction for a device, comprising the steps of:
extending an electrically conductive layer at least substantially around said device for EMI shielding;
depositing a first protective layer of parylene C directly onto the electrically conductive layer of said EMI shield; and
depositing a second protective layer of parylene D in contact with the first protective layer of parylene C.

33. The method of claim 32, further comprising the step of forming an electrically insulating layer between the device and the electrically conductive layer.

34. The method of claim 33, further comprising the step of forming an adhesion-promoting layer between the electrically insulating layer and the electrically conductive layer.

* * * * *